June 13, 1933.  R. L. BLANCHARD  1,914,237

INDEPENDENT WING LOCKING DEVICE FOR REVOLVING DOORS

Filed May 14, 1931  2 Sheets-Sheet 1

WITNESSES

INVENTOR
Robert L. Blanchard
BY Munn & Co.
ATTORNEY

June 13, 1933. R. L. BLANCHARD 1,914,237
INDEPENDENT WING LOCKING DEVICE FOR REVOLVING DOORS
Filed May 14, 1931 2 Sheets-Sheet 2
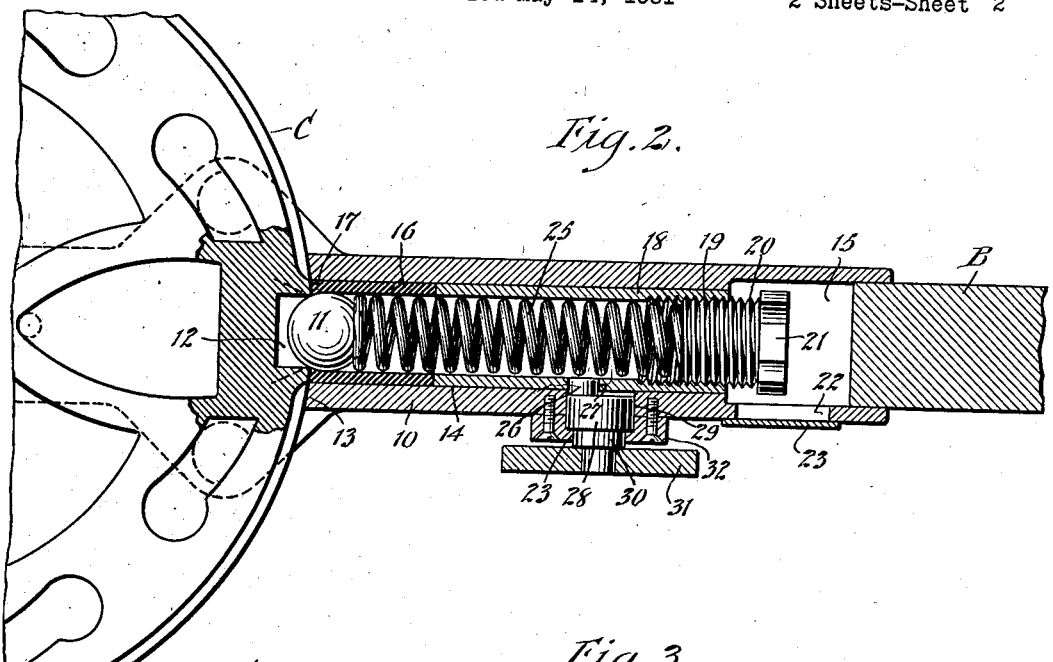
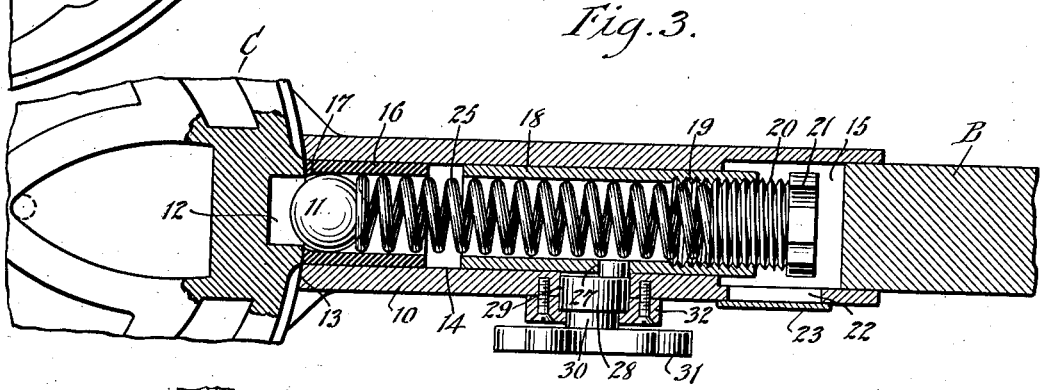
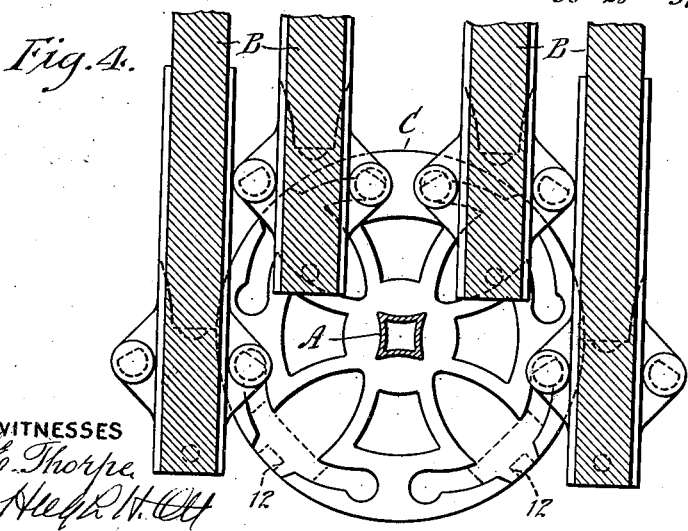
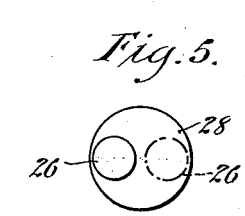
WITNESSES
E. Thorpe
Hugh H. Ott
INVENTOR
Robert L. Blanchard
BY Munn & Co.
ATTORNEY Patented June 13, 1933

1,914,237

UNITED STATES PATENT OFFICE

ROBERT L. BLANCHARD, OF NEW YORK, N. Y., ASSIGNOR TO VAN KANNEL REVOLVING DOOR COMPANY, OF NEW YORK, N. Y., A CORPORATION OF NEW JERSEY

INDEPENDENT WING LOCKING DEVICE FOR REVOLVING DOORS

Application filed May 14, 1931. Serial No. 537,437.

This invention relates to a wing locking device for revolving doors and while not particularly restricted to such use, the devices are especially applicable to doors of the full collapsible panic-proof type in which the wings are suitably supported from a rotary central support or spindle for guided swinging movement from a normal radial relation to a fully collapsed parallel position projecting from one side of the central support.

Ordinarily in this type of door, the wings are sustained in their normal radial relation by devices such as cables, braces or equivalent means which extend between each adjacent pair of wings, and which devices are releasable under an abnormal pressure or a pressure exceeding that usually exerted in turning the door. Some objections have been registered against the use of such devices, notably, their interference to some extent with the use of the complete space defined between each pair of door wings; the failure in some instances to properly set the wings in true radial position so as to obtain the proper air-lock between the inner edges of the wings and the central support; the difficulty of adjusting and the failure to maintain the cables in a taut condition so as to prevent play between the wings resulting in noisy operation of the door and the expense of production, installation and maintenance of the cables or equivalent devices.

The present invention broadly comprehends an improved independent wing retaining device which overcomes the above recited objections by employing a detent means disposed wholly within the wing and cooperating with a keeper on the wing support, which device is of itself sufficiently effective to sustain the wing in a normal radial position in the ordinary use and operation of the door.

More specifically, the invention resides in a wing locking device of the indicated character having a spring pressed detent with means to facilitate a temporary reduction of the spring pressure thereon, whereby to facilitate the operations of setting or folding the door, and this without disturbing the normal adjustment or set pressure of the spring, which normal adjustment or set pressure is automatically restored when the means for effecting the temporary reduction of said pressure is returned to a normal position.

The invention further aims to provide an improved independent wing lock for each door wing which employs but few and simple parts capable of economical production, assembly and installation on the door wings, and which is practically fool-proof to insure the proper setting of the door wings and the folding of the same with great facility.

With the above recited and other objects in view, reference is had to the following description and accompanying drawings, in which there is exhibited one example or embodiment of the invention, while the claims define the actual scope of the same.

In the drawings:

Figure 2 is an enlarged fragmentary horizontal sectional view taken approximately on the line indicated at 2—2 in Figure 1, and illustrating the detent in its normal condition under the normal set pressure of the spring.

Figure 3 is a similar view illustrating the spring pressure temporarily reduced to facilitate the swinging of the wing to a folded condition from a set condition or vice versa.

Figure 4 is a fragmentary horizontal sectional view illustrating the wings in fully collapsed position.

Figure 5 is a detail view of the crank or eccentric for varying the tension of the detent.

Figure 1:
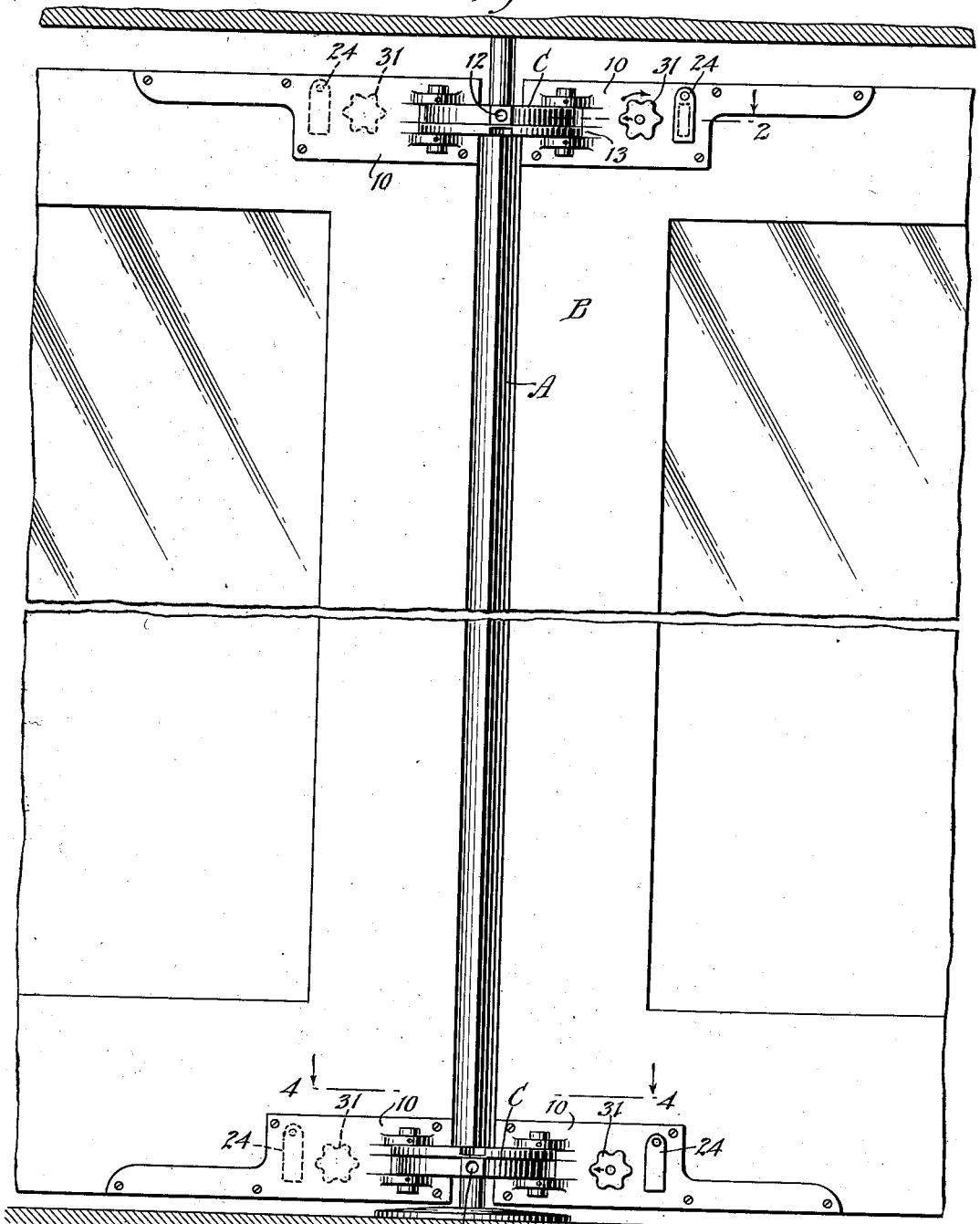
Figure 1 is a fragmentary vertical sectional view through a revolving door structure equipped with wing locking devices constructed in accordance with the invention, and illustrating the door wings in their normal radial position.

In the present invention, the wing locking devices are disclosed as used in connection with a full collapsible panic-proof door of the type set forth in my copending application, Serial No. 518,569, although it is to be understood that the devices may be applied to any other form of revolving door to which they may be applicable.

Referring to the drawings by characters of reference, A designates the central support or spindle, which is mounted for rotation in any manner common to this class of doors. The door wings B are connected to, supported from and guided with respect to the central support or spindle A, to permit of their independent movement from a normal radially disposed active position to a fully collapsed inactive or other folded positions, by any suitable means, such as the plates or disks C, which are carried adjacent the upper and lower ends of the central support or spindle A. In the present instance, the upper and lower inner corners of each door wing B carry a mounting fixture or plate 10 which partially functions as a support for the pins which engage with the slotted portions of the disks C to connect, mount and guide the door wings with respect to the central support. The fixtures or plates 10 further serve as a mounting for a detent 11, herein illustrated as a ball, which is designed to be partially projected from its mounting into a keeper 12, which in the present instance is disclosed as a recess in the periphery of the disk C, there being one keeper recess in each disk for each door wing. The fixtures or plates 10 are notched or cut out as at 13 to accommodate the disks C, and from the notched or cutout portion the fixtures or plates 10 are formed with an outwardly extending bore 14 which opens into or communicates with a recess 15 adjacent the outer end of the plate. At its inner end, the bore is lined with a stationary cylindrical bushing 16, the inner diameter of which corresponds approximately to the diameter of the detent or ball 11, except for its extreme inner end 17, which is offset or flares inwardly to constitute a shoulder for limiting the projection of the detent or ball from the inner end of the bushing into the notched or cutout portion 13 of the plate or fixture 10. The bore 14 further receives an auxiliary movable and rotatory sleeve 18 which has an outer diameter corresponding approximately to the bore 14 and an inner diameter corresponding approximately to the inner diameter of the bushing 16. The sleeve, as illustrated, is of a length to extend from the bushing 16 to the outer end of the bore 14 where said bore communicates with the recess 15, and the sleeve 18 at its outer end is internally threaded as at 19 to threadedly receive an adjustable closure plug 20 having a notched head 21, by virtue of which the plug may be adjusted by screwing the same axially of the sleeve. In order to gain access to the notched head 21 of the plug, one of the side walls of the outer recessed portion 15 is provided with an opening 22 which is normally closed by a cover 23, which may be displaced either by mounting the same to swing on a pivot 24 as illustrated, or otherwise. A coiled expansion spring 25 is arranged to be partially disposed within the bushing 16 and sleeve 18 with its opposite end convolutions bearing respectively against the detent ball and the inner end of the adjustable plug 20. With the parts arranged in the position illustrated in Figure 2, the pressure of the spring 25 is initially adjusted by screwing the plug 20 inwardly or outwardly to obtain a normal more or less permanent setting of the spring pressure, which may be subsequently adjusted to compensate for wear or weakening of the spring or to optionally increase or decrease the normal or set spring pressure so as to project the detent radially inward into engagement with the keeper 12 to lock the door wing against release under the ordinary pressure required to turn the door but capable of permitting its release when an excessive pressure or a pressure exceeding that necessary to turn the door, is exerted on the wing as, for instance in the event of a panic.

In order to temporarily reduce the set spring pressure so as to facilitate the movement of the door wings from their normal radial position to a folded position or vice versa, the sleeve 18 is axially moved by an eccentric or crank pin 26 which extends into a radial opening 27 in the sleeve, and which pin is eccentrically mounted on a rotatory head 28 which is journaled in a bearing opening 29 in the side of the fixture or plate 10, and which head is provided with an outwardly projecting shank 30 to which is secured a manipulating knob 31. As shown, an annular retaining piece 32 is attached to the plate 10, and said retaining piece has an inwardly extending annular flange 33 at its outer end which prevents outward displacement of the head 28. It thus follows that when the knob 31 is turned in a clockwise direction as viewed in Figure 1, the sleeve is shifted from the position illustrated in Figure 2 to the position illustrated in Figure 3, obviously materially reducing the pressure of the spring 25 to permit of ready swinging movement of the door wing, due to the pressure reduction on the detent 11, and this without destroying the normal set adjustment of the spring pressure. During the axial movement of the sleeve, said sleeve turns slightly to compensate for the arc of movement of the crank pin 26 and, hence, due to the necessity of this rotatory movement, the crank pin is self locking when the spring is under its greatest tension, due to the downward movement of the crank pin past dead center, so as to avoid accidental or unintentional shifting movement of the sleeve outwardly under the expansive action of the spring. Obviously, through the medium of the adjustable plug 20, the normal set pressure of the spring may be varied or adjusted by opening the cover 23 and engaging a suitable tool or wrench with the notched head 21.

From the foregoing, it will thus be seen that an individual locking device for each wing has been devised which is independent of the locking device for the other wings, which devices accomplish their purpose in a highly efficient manner, overcome the objections previously noted to the use of cables and which devices may be economically produced and installed on the wings. The devices are susceptible of various changes in their form which properly fall within the scope of the claims and, hence, it is understood that no limitation to the precise structural details is intended, inasmuch as they are merely illustrative of that form which has been selected for the purpose of this disclosure.

What is claimed is:

1. In a revolving door having a central support and a plurality of wings supported by the central support for independent swinging movement relative thereto; an individual locking device for each wing comprising a keeper on the central support for each wing, a detent carried within each wing, a spring having a normally set pressure acting to urge the detent radially inward and tensioning the same against release under the ordinary pressure required to turn the door and means including a manipulator exterior of the door wing for temporarily reducing the spring pressure without destroying the normally set pressure so as to facilitate the movement of the door wings to a folded or set condition.

2. In a revolving door having a central support and a plurality of wings supported by the central support for independent swinging movement relative thereto; an individual locking device for each wing comprising a keeper on the central support for each wing, a detent carried within each wing, a spring having a normally set pressure acting to urge the detent radially inward and tensioning the same against release under the ordinary pressure required to turn the door and means including a manipulator exterior of the door wing for temporarily reducing the spring pressure without destroying the normally set pressure so as to faclitate the movement of the door wings to a folded or set condition, said means consisting of a spring holder shiftable with reference to the spring axis to vary the tension of the spring.

3. In a revolving door having a central support and a plurality of wings supported by the central support for independent swinging movement relative thereto; an individual locking device for each wing comprising a keeper on the central support for each wing, a detent carried within each wing, a spring having a normally set pressure acting to urge the detent radially inward and tensioning the same against release under the ordinary pressure required to turn the door and means for temporarily reducing the spring pressure without destroying the normally set pressure so as to facilitate the movement of the door wings to a folded or set condition, said means consisting of a spring holder shiftable with reference to the spring axis to vary the tension of the spring and means including a manipulator exterior of the door wing for shifting said holder.

4. In a revolving door having a central support and a plurality of wings supported by the central support for independent swinging movement relative thereto; an individual locking device for each wing comprising a keeper on the central support for each wing, a detent carried within each wing, a spring having a normally set pressure acting to urge the detent radially inward and tensioning the same against release under the ordinary pressure required to turn the door and means for temporarily reducing the spring pressure without destroying the normally set pressure so as to facilitate the movement of the door wings to a folded or set condition, said means consisting of a spring holder shiftable with reference to the spring axis to vary the tension of the spring and means for shifting said holder consisting of a radial opening in the holder and an eccentrically mounted pin engaging in the opening movable with reference to an axis radial to the spring axis.

5. In a revolving door having foldable wings, an individual locking device for each wing including a detent mounted for radial inward projection from the wing into engagement with the central support, a spring normally acting to effect the projection of the detent and possessing a sufficient normal pressure to prevent retraction of the detent under the ordinary pressure required to turn the door and a spring holder for the outer end of the spring shiftable with reference to the spring axis to reduce the normal spring pressure whereby to facilitate movement of the door wing to and from its locked condition and rendering the detent usable under its reduced tension as a guide means for indicating the proper radial position of the wing.

6. In a revolving door, an independent locking device for each wing including a keeper on the central support, a detent mounted for guided movement within the wing, a spring having a normal pressure for urging the detent radially inward into engagement with the keeper and for tensioning the same against disengagement therefrom under the ordinary pressure required to turn the door and means including an exposed manipulator for reducing the normal spring pressure to facilitate movement of the wings to fold or set the same.

7. In a revolvng door, an independent locking device for each wing including a keeper on the central support, a detent mounted for guided movement within the wing, a spring having a normal pressure for urging the detent radially inward into engagement with the keeper and for tensioning the same against disengagement therefrom under the ordinary pressure required to turn the door and means for reducing the normal spring pressure to facilitate movement of the wings to fold or set the same, said means consisting of a sleeve having a closed end and within which one end of the spring is received, a bore within which the sleeve is mounted for shifting movement with reference to the axis of the spring and means for shifting the sleeve in said bore.

8. In a revolving door, an independent locking device for each wing including a keeper on the central support, a detent mounted for guided movement within the wing, a spring having a normal pressure for urging the detent radially inward into engagement with the keeper and for tensioning the same against disengagement therefrom under the ordinary pressure required to turn the door and means for reducing the normal spring pressure to facilitate movement of the wings to fold or set the same, said means consisting of a sleeve having a closed end and within which one end of the spring is received, a bore within which the sleeve is mounted for shifting movement with reference to the spring axis and for rotatory movement, and eccentric means engageable with the sleeve for effecting simultaneous rotatory and axial movement thereof.

9. In a revolving door having the combination of a central support and a plurality of wings supported thereby and guided for independent swinging movement with respect thereto; a device for locking each wing in radial position independent of the other wings consisting of a keeper on the central support for each wing, a detent mounted within each wing, a spring having a normal pressure for urging the detent into engagement with the keeper, a slidable spring seat mounted for movement to vary the normal pressure of the spring and means including an exposed manipulator for shifting said spring seat.

10. In a revolving door having the combination of a central support and a plurality of wings supported thereby and guided for independent swinging movement with respect thereto; a device for locking each wing in radial position independent of the other wings consisting of a keeper on the central support for each wing, a detent mounted within each wing, a spring having one end engaging the detent for urging said detent into engagement with the keeper, a spring end holder for the other end of the spring, said holder including a tubular body and a spring seat adjustable with reference to the body to vary and maintain a normal set pressure of the spring and means including an exposed manipulator for shifting the spring holder with reference to the axis of the spring to temporarily reduce the spring pressure without destroying its normal set pressure.

11. In a revolving door having a plurality of wings supported from and guided for independent swinging movement with respect to a central support; means for maintaining said wings in radial position including a keeper for each wing provided on the central support and a detent mounted within each wing urged under a normal set pressure into engagement with its keeper and tensioned against displacement under the ordinary pressure required to turn the door and means including an exposed manipulator for temporarily reducing the normal set pressure of the detent without destroying said normal set pressure, so as to facilitate folding or setting of the wings.

12. In a revolving door wing locking device, a detent mounted within the wing and urged under a normal pressure to hold the wing in set position and means including an exposed manipulator for temporarily reducing the normal pressure of the detent without destroying said normal detent pressure so as to facilitate movement of the wing to set or folded positions.

13. In a revolving door wing locking device, a detent mounted within the door wing, a spring having a predetermined normal pressure for urging and maintaining the detent in its active position and means including an exposed manipulator for temporarily reducing said predetermined normal pressure of the spring so as to facilitate movement of the wing to set or folded positions.

14. In a revolving door wing locking device, a detent, a spring seat spaced from the detent, a spring interposed between the detent and spring seat and having a predetermined pressure to normally render the detent effective to hold the wing in radial position under the ordinary pressure for operating the door and means including an exposed manipulator for increasing the spacing between the detent and spring seat to reduce the predetermined spring pressure for facilitating movement of the wing to set or folded positions.

15. In a revolving door wing locking device, a detent, a spring seat spaced from the detent, a spring interposed between the detent and spring seat and having a predetermined pressure to normally render the detent effective to hold the wing in radial position under the ordinary pressure for operating the door and means for increasing the spacing between the detent and spring seat to reduce the predetermined spring pressure for facilitating movement of the wing to set or folded positions, said means including a rotary element mounted on an axis perpendicular to the spring axis and movement of the spring seat and a crank pin eccentrically mounted on said rotary element and engaging with the spring seat.

16. In a revolving door having a central support and a plurality of wings supported by the central support for independent swinging movement relative thereto, tensioned means for releasably retaining the wings in a normal radial position subject to movement to a folded position by the application of a force in excess of that necessary to revolve the door and means carried by each wing capable of manipulation exteriorly of the wing to modify the tension of said first means whereby to enable the movement of the wings to a folded position by a relatively lesser force applied to said wing.

ROBERT L. BLANCHARD.